(12) United States Patent
Shirota et al.

(10) Patent No.: US 7,297,732 B2
(45) Date of Patent: Nov. 20, 2007

(54) SOLID COMPOSITION

(75) Inventors: Akiko Shirota, Toyonaka (JP); Hidetoshi Fukuo, Yao (JP)

(73) Assignee: Sakura Color Products Corporation, Osaka-Fu (JP)

( * ) Notice: Subject to any disclaimer, the term of this patent is extended or adjusted under 35 U.S.C. 154(b) by 0 days.

(21) Appl. No.: 09/804,509

(22) Filed: Mar. 12, 2001

(65) Prior Publication Data

US 2001/0029275 A1 Oct. 11, 2001

(30) Foreign Application Priority Data

Mar. 10, 2000 (JP) ............................. 2000-067547
Sep. 13, 2000 (JP) ............................. 2000-278303

(51) Int. Cl.
*C08G 18/38* (2006.01)
(52) U.S. Cl. ............................. 524/35; 524/39; 524/40; 524/46; 524/317; 524/376
(58) Field of Classification Search ................ 524/376, 524/35, 39, 40, 46, 317
See application file for complete search history.

(56) References Cited

U.S. PATENT DOCUMENTS

| | | | | |
|---|---|---|---|---|
| 3,749,687 A | * | 7/1973 | Aronberg et al. | ............ 524/277 |
| 3,929,694 A | * | 12/1975 | Columbus | .................... 523/164 |
| 3,957,495 A | * | 5/1976 | Teranishi et al. | ......... 106/31.16 |
| 4,212,786 A | | 7/1980 | Murakami | |
| 4,286,890 A | * | 9/1981 | Dickmann et al. | ............ 401/19 |
| 4,829,108 A | * | 5/1989 | Okuda et al. | .................. 524/37 |
| 5,236,494 A | * | 8/1993 | Kano | .......................... 524/322 |
| 6,048,914 A | * | 4/2000 | Goto et al. | .................. 523/161 |
| 6,074,465 A | * | 6/2000 | Fukuo et al. | ............. 106/31.07 |
| 6,203,910 B1 | * | 3/2001 | Fukuo et al. | ................ 428/413 |

FOREIGN PATENT DOCUMENTS

| | | |
|---|---|---|
| DE | 29 06 771 | 8/1979 |
| JP | 08 120209 | 5/1996 |
| JP | 11 209679 | 8/1999 |

* cited by examiner

*Primary Examiner*—Bernard Lipman
(74) *Attorney, Agent, or Firm*—Knobbe, Martens, Olson & Bear, LLP

(57) ABSTRACT

The invention has for its primary object to provide a solid composition having excellent wet-surface writing properties and high safety. The object is accomplished by the provision of a solid composition characterized by its comprising a colorant, a gelation agent, a resin component and at least two kinds of solvents, each of the resins having the following attribute a) or b):

a) the solvent has an HLB value (X) of $X \leq 6.5$ or
b) the solvent has an HLB value (X) and a solubility parameter value (Y) satisfying the relation of $Y \leq 18-X$ (on condition that $6.5 < X$, $0 < Y$).

20 Claims, No Drawings

SOLID COMPOSITION

FIELD OF THE INVENTION

This invention relates to solid compositions such as crayons.

BACKGROUND OF THE INVENTION

Heretofore known is the crayon essentially composed of a colorant, an organic solvent, a resin component and a gelation agent. For example, the crayon produced by using a resin component and at least one gelation agent selected from the group consisting of dibenzylidene-sorbitol and tribenzylidene-sorbitol, inclusive of their derivatives, is known (Japanese Examined Patent Publication S54-23619). This crayon is characterized in that it is not only resistant to degradation even at high temperature and adheres well to the surfaces of various materials (metals, plastics, etc.) but gives a film on writing which becomes hard enough to prevent migration of the color.

Meanwhile, the crayon representing further improvements in hardness, adhesion, writing properties, etc. is also known (Japanese Examined Patent Publication S55-41716). Thus, there is known a crayon comprising (a) at least one member selected from the group consisting of cellulosic resin and vinyl resin, (b) at least one member selected from the group consisting of ketone resin, xylene resin, amide resin and terpene resin, (c) at least one member selected from the group consisting of dibenzylidene-sorbitol and tribenzylidene-sorbitol, inclusive of their derivatives, (d) at least one member selected from the group consisting of glycols, glycol ethers, glycol ether esters and benzoic acid esters, and (e) a colorant.

Aside from the above, there also is known a solid writing material comprising a gelation agent, an organic solvent, a resin component and a colorant characterized in that, as the gelation agent, a benzylidene-sorbitol is used and, as the organic solvent, at least two kinds of solvents, namely a main solvent comprising an aliphatic lower alcohol and an auxiliary solvent comprising an aprotic polar solvent, are used in combination (Japanese Unexamined Patent Publication H8-120209).

However, even these solid compositions call for improvements in writing properties in order that they may be applied to varied materials with satisfactory results. Particularly, any solid composition allowing writing on a wet surface, if developed, should contribute to an expanded crayon market but the crayons so far available can hardly be used successfully on a wet surface.

Meanwhile, the safety regulations are getting more and more stringent of late in various countries of the world and the development of solid compositions clearing the safety bar with a sufficient margin is being demanded. Particularly in respect of the solvent for use in such a solid composition, there is needed for improvement in safety. In this connection, if only for enhancement in safety, the use of an alcohol (especially ethanol) as the solvent may be contemplated. However, when an alcohol is used as the solvent, acceptable writing properties and adhesion cannot be obtained.

SUMMARY OF THE INVENTION

In view of the above state of the art, there is a pressing need for solid compositions with high safety and improved writing properties (especially in writing on wet surfaces) but none have been developed as yet that satisfy the need. It is, therefore, a primary object of the invention to provide a solid composition having improved wet-surface writing properties and high safety.

After an intensive research for overcoming the disadvantages of the prior art, the present inventor found that a solid composition according to a herein-defined formulation meets the above need and have accordingly developed this invention.

This invention, therefore, is directed to the following solid compositions.

1. A solid composition characterized by its comprising a colorant, a gelation agent, a resin component and at least two kinds of solvents, each of said solvents meeting the following requirement a) or b):
a) the HLB value (X) of the solvent is $X \leq 6.5$ or
b) the HLB value (X) and solubility parameter value (Y) of the solvent satisfy the relation of $Y \leq 18-X$ (on condition that $6.5 < X$, $0 < Y$) [the first invention].
2. A solid composition characterized by its comprising a colorant, a gelation agent, a resin component, and a solvent having a solubility parameter value (Y) of $Y \leq 8.5$ [the second invention].

DETAILED DESCRIPTION OF THE INVENTION

First Invention

The first invention is characterized by its comprising a colorant, a gelation agent, a resin component and at least two kinds of solvents, each of said solvents meeting the following requirement a) or b):
a) the HLB value (X) of the solvent is $X \leq 6.5$ or
b) the HLB value (X) and solubility parameter value (Y) of the solvent satisfy the relation of $Y \leq 18-X$ (on condition that $6.5 < X$, $0 < Y$) [the first invention].

The solvent component is not particularly restricted inasmuch as the above requirement a) or b) is satisfied, and is comprised of 2 or more solvent species. Thus, two or more solvents varying in HLB value or solubility parameter value are used.

Referring to the requirement (a), provided that the HLB value (X) of the solvent is $X \leq 6.5$, its solubility parameter value (Y) is not particularly restricted but, for all practical purposes, is preferably $7 \leq Y \leq 12$.

Referring to the requirement b), the HLB value (X) and solubility parameter value (Y) of the solvent should satisfy the relation of $Y \leq 18-X$ (on condition that $6.5 < X$, $0 < Y$). There is practically no upper limit to HLB value (X) but X may usually be about 9. Thus, the preferred condition is $6.5 < X \leq 9$. The solubility parameter value (Y) need only be larger than 0 generally but is preferably $8 \leq Y \leq 9.5$.

As solvents having such characteristics, there can be mentioned alcohols such as 3-methyl-3-methoxybutanol and 3-methoxy-1-butanol; glycols such as ethylene glycol, propylene glycol, diethylene glycol, dipropylene glycol and hexylene glycol; glycol ethers such as methyl ethers, ethyl ethers, propyl ethers, butyl ethers, phenyl ethers and methyl ether acetates and esters of such glycols, among others.

The glycol ethers mentioned above specifically include ethylene glycol monobutyl ether, propylene glycol monomethyl ether acetate, tripropylene glycol monomethyl ether, dipropylene glycol monomethyl ether, propylene glycol monobutyl ether, diethylene glycol monobutyl ether, propylene glycol monopropyl ether, dipropylene glycol monopropyl ether, dipropylene glycol monobutyl ether, tripropylene glycol monobutyl ether, propylene glycol monophenyl ether and dipropyl glycol monomethyl ether, among others.

In this invention, it is particularly preferable to use at least one member selected from among ethylene glycol monobutyl ether, propylene glycol monobutyl ether, tripropylene glycol monomethyl ether and dipropyl glycol monomethyl ether as an essential component. Thus, it is recommendable to 1) use 2 through 4 of the four kinds of glycol ethers mentioned just above or 2) use at least one of such four kinds of glycol ethers in combination with another solvent or solvents which are compatible therewith (preferably selected from among said glycol ether compounds). As such combinations with other solvents, there can be mentioned the combination of ethylene glycol monobutyl ether with propylene glycol monomethyl ether acetate, the combination of tripropylene glycol monomethyl ether with dipropylene glycol monomethyl ether, and the combination of tripropylene glycol monomethyl ether with propylene glycol methyl ether acetate, to mention but a few examples.

Second Invention

The second invention is characterized by its comprising a colorant, a gelation agent, a resin component and at least one solvent whose solubility parameter value (Y) is Y≦8.5. Thus, the second invention is different from the first invention in that at least one solvent having solubility parameter value (Y) of not more than 8.5 is used in the second invention; otherwise, it is identical to the first invention.

The HLB value of the solvent to be used in the second invention is not particularly restricted but a solvent having an HLB value of about 6~8.5 is usually employed.

As said solvent component having a solubility parameter value of not more than 8.5, the solvents known and/or commercially available can be used. By way of illustration, dipropylene glycol butyl ether and/or tripropylene glycol butyl ether, for instance, can be employed. These solvents can be used singly or two or more them can be used in combination.

First Invention and Second Invention

The solvent content of the solid composition according to the first invention and second invention (hereinafter collectively referred to as this invention) can be judiciously selected with reference to the colorant and other components but may generally be about 20~80 weight %, preferably 35~65 weight %. If the amount of the solvent is too large, the necessary gelation may not be easily achieved. If the solvent is too little, the other components will not be readily dissolved so that a uniform gel may not be obtained.

The colorant is not particularly restricted but includes known pigments and dyes. As such pigments, there can be mentioned inorganic pigments such as titanium dioxide, red iron oxide, ultramarine, cobalt blue, iron yellow, iron black, titanium yellow, carbon black, etc. and organic pigments such as azo, phthalocyanine, anthraquinone, threne, perylene, perinone, indigo, thioindigo, quinacridone, dioxane, isoindoliquinone, quinophthalone, methine and metal complex pigments, among others. Such known extender or filler pigments as calcium carbonate, clay, zinc white, etc. can also be formulated. Furthermore, pearlescent pigments, fluorescent pigments, synthetic mica, metal powders, etc. can also be used.

Particularly when a fluorescent pigment is used, it is preferably a solution-type fluorescent pigment utilizing a polyamide resin as the vehicle(i.e. a fluorescent pigment in the form of a solid solution in a polyamide resin vehicle). The pigment can be produced by dissolving a fluoresent dye in a polyamide resin(transparent matrix).

By using such a fluorescent pigment, an odorless solid composition can be constituted. Moreover, since such a fluorescent pigment may display good fluidity in the manufacturing stage, a more efficient production process can be implemented. When said solution-type fluorescent pigment is used, it is recommendable to select a solvent component which does not aversely affect dissolution of the solution-type fluorescent pigment. As examples of said fluorescent pigment, pigments known and/or commercially available can be mentioned. For example, those pigments available under the tradenames of NKS1004, NKS1005 and NKS1007 (all are products of Nippon Fluorochemical Co.), among others, can be used.

Referring to said dyes, on the other hand, oil-soluble dyes, for instance, can be used with advantage. As such oil-soluble dyes, those known and/or commercially available, such as phthalocyanine dyes, pyrazolone dyes, nigrosine dyes, anthraquinone dyes, azo dyes, and chromium-containing metal dyes, among others, can be employed.

The colorant content of the solid composition can be judiciously adjusted according to the kind of colorant used but may generally be about 5~60 weight %, preferably 10~50 weight %. If the amount of the colorant is excessive, the resulting relative decreases in amount of the other components result in inadequate expression of their respective effects. On the other hand, if the amount of the colorant is too small, no sufficient tinting effect may be obtained.

The gelation agent is not particularly restricted but can be selected from among the gelation agents formulated in the prior art solid compositions described above. For example, dibenzylidene-sorbitols, tribenzylidene-sorbitols, amino acid series oil gelling agents, and fatty acids can be mentioned.

The dibenzylidene-sorbitols include not only dibenzylidene-sorbitol but also derivatives of dibenzylidene-sorbitol as derivatized by substituting the benzene rings of its benzylidene groups with halogen or alkyl groups of 1~3 carbon atoms in optional positions (dibenzylidene-sorbitol derivatives), specifically [di-(p-methylbenzylidene)]-sorbitol, [di-(m-ethylbenzylidene)]-sorbitol, and [di-(p-chlorobenzylidene)]-sorbitol, among others.

The tribenzylidene-sorbitols include not only tribenzylidene-sorbitol but also derivatives of tribenzylidene-sorbitol as derivatized by substituting the benzene rings of its benzylidene groups with halogen or alkyl groups of 1~3 carbon atoms in optional positions (tribenzylidene-sorbitol derivatives), specifically [tri-(p-methylbenzylidene)]-sorbitol, [tri-(m-ethylbenzylidene)]-sorbitol and [tri-(p-chlorobenzylidene)]-sorbitol, among others.

The oil gelation agents of the amino acid series include but are not limited to N-acylglutamyl-diamides and N-lauroylglutamyl-di-n-butyramide.

The fatty acids mentioned above include fatty acids, such as stearic acid, myristic acid, 12-hydroxystearic acid, etc., hydroxy-fatty acids, and metal salts (alkali metal salts) or ammonium salts of such fatty acids.

The gelation agent content of the solid composition can be judiciously selected according to the kind of gelation agent, among other variables, but may generally be about 2~12 weight %, preferably 3~8 weight %. If the proportion of the gelation agent is too large, the gel will be increased in hardness to the extent of reducing the tinting power. If the amount of the gelation agent is too small, gelation will become difficult.

The resin component for use in the solid composition of the invention is not particularly restricted but the resins heretofore used in gel crayons can be employed. In the practice of this invention, it is preferable to use two kinds of resins in combination, namely a film-forming resin and an adhesion-improving resin.

The film-forming resin is not particularly restricted insofar as it is capable of augmenting the hardness of the solid composition and forming a tough film on the painted surface. Thus, for example, the cellulosic resin, such as cellulose acetate butyrate, ethylcellulose, acetylcellulose, etc., and the vinyl resin, such as poly(vinyl butyral), poly(vinyl acetate), poly(vinyl acetate-co-vinyl chloride), and poly(vinyl acetate-co-ethylene) resins, among others, can be mentioned. These film-forming resins can be used singly or in a suitable combination. Among them, a poly(vinyl butyral) having a polymerization degree of 200~2000 with an acetyl content of not more than 5%, a hydroxyl content of 12~37% and a butyral content of not less than 60% is preferred.

On the other hand, the adhesion-improving resin is not particularly restricted insofar as the adhesion to the surface painted can be improved. For example, there can be used the ketone resin, xylene resin, polyamide resin and acrylic resin, among others. The ketone resin includes but is not limited to the condensation product of cyclohexane with formaldehyde. The xylene resin includes but is not limited to the condensation product of m-xylene and formaldehyde. The polyamide resin includes a thermoplastic resin having a molecular weight of about 4000~9000 as obtainable by, for example, polycondensation of a dimer acid with a di- or polyamine. As the acrylic resin, thermoplastic acrylic resins can be employed. These adhesion-improving resins can be used singly or in an optional combination.

The proper resin content of the solid composition depends on the kind of resin used but may usually be about 3~40 weight %, preferably 6~35 weight %. If the resin content is too high, the gel will be increased so much in hardness as to reduce the tinting power, for instance. If the resin content is too low, gelation may hardly take place.

While the formulating amounts of said film-forming resin and adhesion-improving resin can also be selected with reference to the other component materials, the weight ratio of the film-forming resin to the adhesion-improving resin may usually be about 1:0.1~5, preferably 1:0.2~3.

Optionally, the solid composition of the invention may be supplemented with other ingredients, e.g. various additives such as the known filler, leveling agent, viscosity modifier, structural viscosity-imparting agent, drying agent, etc. in suitable proportions. Furthermore, a plasticizer such as diethyl phthalate, dibutyl phthalate, dioctyl phthalate, 2-ethylhexyl epoxyhexahydrophthalate, 2-ethylhexyl sebacate, tricresyl phosphate or the like can be formulated in a suitable amount.

The gel hardness of the solid composition according to the invention can be judiciously selected according to the intended application of the end product but may usually be about 5~50 kg/cm$^2$, preferably 7~30 kg/cm$^2$. The gel hardness can be controlled by adjusting the kinds and formulating amounts of organic solvent and gelation agent, for instance.

Basically the method of producing the solid composition of the invention comprises admixing the above-mentioned components uniformly. A typical process comprises dissolving the film-forming resin in a portion of the solvent (a portion of the solvent mixture or one constituent solvent of the solvent mixture), dispersing the colorant thoroughly in the resulting solution by means of a mill or the like, adding the remainder of the solvent (the balance of the solvent mixture or the other constituent solvent of the solvent mixture), dissolving the adhesion-improving resin, gelation agent, etc. further in the solution, pouring the final solution into a vessel of the desired geometry, and cooling it to solidify.

In dissolving the various components in the above process, heating may be carried out where necessary. The solid composition of the invention can also be produced by the known manufacturing process for crayons using the above components.

Since the solid composition of the invention uses the solvent meeting the herein-defined characteristic requirement, it offers excellent writing or drawing properties and high safety. Particularly with regard to writing properties, the composition can be applied to all kinds of materials inclusive of paper, metals, ceramics, plastics and glass. Furthermore, writing can be made on wet surfaces of such materials. Thus, this composition has excellent wet-surface writing properties and, as such, is of use as a solid composition for writing or drawing on wet surfaces. In other words, the present invention includes a method of writing or drawing with the solid composition on wet surfaces.

In addition, it provides for good adhesion and, after application, the film hardens to preclude color migration. The composition is superior to the prior art composition in leveling performance, in particular, and provides for fast writing. Furthermore, it offers a good cap-off life, facilitating handling as compared with the conventional solid composition.

The solid composition of the invention which features safety and writing properties as mentioned above can be used with advantage in a broad spectrum of applications such as a writing or drawing instrument, a marker and a paint in solid formats applicable to any and all kinds of surfaces. For example, crayons, stick-form composition for writing, painting or marking, pastel chalk, marking chalk, and markers for writing on steel, rubber, cloth, plastics, cardboard, wood, glass, concrete and other materials can be mentioned.

EXAMPLES

The following examples and comparative examples are intended to illustrate the advantages of the solid composition of the invention. It is, however, to be understood that the invention is by no means limited to these examples.

Example 1

In 10.5 weight parts of ethylene glycol monobutyl ether was dissolved 15 weight parts of cellulose acetate butyrate. Using a mill, 24 weight parts of the pigment (titanium dioxide) was thoroughly dispersed in the above solution, followed by addition of 6 weight parts of propylene glycol monomethyl ether acetate and 19 weight parts of tripropylene glycol monomethyl ether. Under stirring at 130° C., 20 weight parts of xylene resin (Nikanol HP-120; product of Mitsubishi Gas Chemical Co.) was added and dissolved thoroughly at the same temperature as above. Then, 5.5 weight parts of the gelation agent (Gel All T, a sorbitol series gelation agent; product of Shin Nihon Rika) was added and dissolved thoroughly. The solution thus obtained was poured into a vessel and cooled to solidify and the resulting solid product was taken out.

Examples 2~6

Using the component materials mentioned in Table 1, the procedure of Example 1 was otherwise repeated to give solid compositions. Each figure in Table 1 indicates "weight %".

TABLE 1

| | | Example | | | | | |
|---|---|---|---|---|---|---|---|
| | | 1 | 2 | 3 | 4 | 5 | 6 |
| Colorant | Titanium dioxide | 24.0 | | | | 18.0 | |
| | Phthalocyanine blue | | 15.0 | | 22.0 | | |
| | Carbon black | | | 18.0 | | | 24.0 |
| Gelation agent | 12-Hydroxystearic acid | | | 4.0 | | | 3.5 |
| | Gel All D | | | 6.0 | | 6.0 | |
| | Gel All T | 5.5 | | | 4.0 | | |
| Resin | PVB2000L | | | 15.0 | 15.0 | 21.0 | |
| | Cellulose acetate butyrate | 15.0 | 27.0 | | | | 21.0 |
| | Hilac 111 | | 5.0 | 10.0 | | 5.0 | |
| | Versamide 335 | | | | 4.0 | 9.0 | |
| | Nikanol HP-120 | 20.0 | | | 8.0 | | |
| | Dianal BR-100 | | | | 4.0 | | 14.0 |
| Organic solvent | Ethylene glycol monobutyl ether | 10.5 | 10.5 | | | 10.0 | 10.0 |
| | Propylene glycol monomethyl ether acetate | 6.0 | | | | | 5.5 |
| | Tripropylene glycol monomethyl ether | 19.0 | 22.0 | 23.5 | 16.0 | | 22.0 |
| | Dipropylene glycol monomethyl ether | | | 23.5 | 15.5 | 17.5 | |
| | Propylene glycol monobutyl ether | | 16.5 | | 15.5 | 13.5 | |
| Wet-face writing properties | | ○ | ○ | ○ | ○ | ○ | ○ |
| Toxicity | | ○ | ○ | ○ | ○ | ○ | ○ |

Particulars of the gelation agents and resins mentioned in Table 1 are as follows (these apply to Table 2 as well).

Gel All D . . . the tradename of a sorbitol series gelation agent manufactured by Shin Nihon Rika.

Gel All T . . . the tradename of a sorbitol series gelation agent manufactured by Shin Nihon Rika.

PVB2000L . . . Denka Butyral 2000L, the tradename of a poly(vinyl butyral) manufactured by Denki Kagaku Kogyo K.K.

S-Lec BL-SH . . . the tradename of a butyral resin manufactured by Sekisui Chemical Co., Ltd.

Hilac 111 . . . the tradename of a ketone resin manufactured by Hitachi Chemical Co., Ltd.

Versamid 335 . . . the tradename of an amide resin manufactured by Henkel Hakusuisha, Ltd.

Nikanol . . . Nikanol HP-120, the tradename of a xylene resin manufactured by Mitsubishi Gas Chemical Co., Inc.

Dianal BR-100 . . . the tradename of an acrylic resin manufactured by Mitsubishi Rayon Co., Ltd.

Comparative Example 1

Except that the solvent mentioned in Table 2 was formulated in lieu of the solvent used in Example 1, a solid composition was prepared in otherwise the same manner as in Example 1. Each figure in Table 2 indicates "weight %" (the same applies below).

TABLE 2

| | | Comparative Example | | | | | | | |
|---|---|---|---|---|---|---|---|---|---|
| | | 1 | 2 | 3 | 4 | 5 | 6 | 7 | 8 |
| Colorant | Titanium dioxide | 24.0 | | | | 18.0 | | | |
| | Phthalocyanine blue | | 15.0 | | 22.0 | | | 18.0 | 24.0 |
| | Carbon black | | | 18.0 | | | 24.0 | | |
| Gelation agent | 12-Hydroxystearic acid | | 4.0 | | | | 3.5 | | 3.5 |
| | Gel All D | | | 6.0 | | 6.0 | | 6.0 | |
| | Gel All T | 5.5 | | | 4.0 | | | | |
| Resin | PVB2000L | | | 15.0 | 15.0 | 21.0 | | 15.0 | |
| | Cellulose acetate butyrate | 15.0 | 27.0 | | | | 21.0 | | 21.0 |
| | Hilac 111 | | 5.0 | 10.0 | | 5.0 | | 10.0 | |
| | Versamide 335 | | | | 4.0 | 9.0 | | 4.0 | |
| | Nikanol HP-120 | 20.0 | | | 8.0 | | | | |
| | Dianal BR-100 | | | | 4.0 | | 14.0 | | 14.0 |
| Organic solvent | Propylene glycol monomethyl ether | 10.5 | 10.5 | | 16.0 | 10.0 | 10.0 | | |
| | Propylene glycol diacetate | 6.0 | 22.0 | 23.5 | 15.5 | 17.5 | 5.5 | | |
| | Diethylene glycol monomethyl ether | 19.0 | 16.5 | 23.5 | 15.5 | 13.5 | 22.0 | | |

TABLE 2-continued

|  | Comparative Example | | | | | | | |
|---|---|---|---|---|---|---|---|---|
|  | 1 | 2 | 3 | 4 | 5 | 6 | 7 | 8 |
| Ethylene glycol monobutyl ether |  |  |  |  |  |  | 47.0 |  |
| Dipropylene glycol monomethyl ether |  |  |  |  |  |  |  | 37.5 |
| Wet-face writing properties | x | x | x | x | x | x | ○ | x |
| Toxicity | ○ | ○ | ○ | ○ | ○ | ○ | x | ○ |

Comparative Example 2

Except that the solvent mentioned in Table 2 was formulated in lieu of the solvent used in Example 2, a solid composition was prepared in otherwise the same manner as in Example 2.

Comparative Example 3

Except that the solvent mentioned in Table 2 was formulated in lieu of the solvent used in Example 3, a solid composition was prepared in otherwise the same manner as in Example 3.

Comparative Example 4

Except that the solvent mentioned in Table 2 was formulated in lieu of the solvent used in Example 4, a solid composition was prepared in otherwise the same manner as in Example 4.

Comparative Example 5

Except that the solvent mentioned in Table 2 was formulated in lieu of the solvent used in Example 5, a solid composition was prepared in otherwise the same manner as in Example 5.

Comparative Example 6

Except that the solvent mentioned in Table 2 was formulated in lieu of the solvent used in Example 6, a solid composition was prepared in otherwise the same manner as in Example 6.

Comparative Example 7

Except that the solvent mentioned in Table 2 was formulated in lieu of the solvent used in Example 3, a solid composition was prepared in otherwise the same manner as in Example 6.

Comparative Example 8

Except that the solvent mentioned in Table 2 was formulated in lieu of the solvent used in Example 6, a solid composition was prepared in otherwise the same manner as in Example 6.

Test Example 1

The solid composition (stick-form composition) obtained in each example or comparative example was evaluated for writing properties (and safety). The results are shown in the bottom row(s) of Table 1 or 2. These evaluations were made by the following methods.

(1) Wet-Surface Writing Properties

An organoleptic test was carried out by direct writing with each solid composition on an iron plate, a plastic [rigid poly(vinyl chloride)] plate, and a slab of polystyrol foam in water and the results were evaluated according to the following criteria, viz. ○=writable, Δ=writable with some difficulty, x=not writable. The iron plate, plastic plate and polystyrol foam slab were wiped using ethanol in advance and, then, wiped with dry cloth prior to testing.

(2) Toxicology

Toxicity tests were performed in accordance with the test protocol established by Art and Creative Materials Institute and Council Directives 67-548-EEC and 88-379-EEC and the results were evaluated according to the following criteria: ○=the requirements for solvents satisfied, x=toxicity labeling required.

Examples 7~12

Using solution-type fluorescent pigments utilizing a polyamide resin vehicle as the colorant, together with other components as mentioned in Table 3, solid compositions were manufactured in otherwise the same manner as in Example 1. Each figure in Table 3 indicates "weight %".

TABLE 3

|  |  | Example | | | | | |
|---|---|---|---|---|---|---|---|
|  |  | 7 | 8 | 9 | 10 | 11 | 12 |
| Colorant | Titanium dioxide | 10.0 |  |  | 8.0 | 3.0 | 9.0 |
|  | NKS1004 (Nippon Fluorochemical) | 14.0 |  |  |  |  | 15.0 |
|  | NKS1005 (Nippon Fluorochemical) |  | 15.0 |  |  | 15.0 |  |
|  | NKS1007 (Nippon Fluorochemical) |  |  | 18.0 | 10.0 |  |  |

TABLE 3-continued

|  |  | Example | | | | | |
|---|---|---|---|---|---|---|---|
|  |  | 7 | 8 | 9 | 10 | 11 | 12 |
| Gelation agent | 12-Hydroxystearic acid |  | 4.0 |  |  |  | 3.5 |
|  | Gel All D |  |  | 6.0 | 6.0 |  |  |
|  | Gel All T | 5.5 |  |  |  | 4.0 |  |
| Resin | S-Lec BL-SH |  |  |  | 9.0 |  |  |
|  | PVB2000L |  |  | 15.0 | 5.0 | 21.0 |  |
|  | Cellulose acetate butyrate | 15.0 | 27.0 |  |  |  | 21.0 |
|  | Hilac 111 |  |  | 10.0 | 12.0 | 7.0 |  |
|  | Versamide 335 |  | 5.0 | 4.0 |  | 9.0 | 9.0 |
|  | Nikanol HP-120 | 20.0 |  |  |  |  |  |
|  | Dianal BR-100 |  |  |  |  |  | 5.0 |
| Organic solvent | Ethylene glycol monobutyl ether |  | 10.5 |  | 12.0 | 10.0 | 10.0 |
|  | Propylene glycol monomethyl ether acetate |  |  | 5.0 |  |  | 5.5 |
|  | Tripropylene glycol monomethyl ether |  | 22.0 | 18.0 |  |  | 22.0 |
|  | Dipropylene glycol monomethyl ether | 35.5 |  | 24.0 | 19.0 | 21.0 |  |
|  | Propylene glycol monobutyl ether |  | 16.5 |  | 19.0 | 10.0 |  |

Test Example 2

Using the solid compositions (stick-form compositions) obtained in Examples 7~12, the fluidity during manufacture and the odor (formaldehyde odor) in manufacture and use were investigated. As a result, all the solid compositions were found satisfactory in fluidity during manufacture. Moreover, no odor was noticeable with any composition during manufacture and use.

The invention claimed is:

1. A solid composition comprising a colorant, a gelation agent, a resin component, and a mixture of at least two different solvents, wherein the mixture
   (i) comprises at least two solvents selected from the group consisting of ethylene glycol monobutyl ether, propylene glycol monobutyl ether, tripropylene glycol monomethyl ether and dipropyl glycol monomethyl ether; or
   (ii) comprises at least one solvent selected from the group consisting of ethylene glycol monobutyl ether, propylene glycol monobutyl ether, tripropylene glycol monomethyl ether and dipropyl glycol monomethyl ether; and at least one solvent selected from the group consisting of ethylene glycol monobutyl ether, propylene glycol monomethyl ether acetate, tripropylene glycol monomethyl ether, dipropylene glycol monomethyl ether, propylene glycol monobutyl ether, diethylene glycol monobutyl ether, propylene glycol monopropyl ether, dipropylene glycol monopropyl ether, dipropylene glycol monobutyl ether, tripropylene glycol monobutyl ether, propylene glycol monophenyl ether and dipropyl glycol monomethyl ether.

2. A solid composition according to claim 1 wherein the mixture is selected from the group consisting of:
   (i) ethylene glycol monobutyl ether and propylene glycol monomethyl ether acetate;
   (ii) tripropylene glycol monomethyl ether and dipropylene glycol monomethyl ether; and
   (iii) tripropylene glycol monomethyl ether and propylene glycol methyl ether acetate.

3. A solid composition according to claim 1 wherein the resin component comprises at least one selected from the group consisting of ketone resin, xylene resin, polyamide resin, and acrylic resin.

4. A solid composition according to claim 1 wherein the resin component comprises at least one selected from the group consisting of butyral resin, vinyl acetate resin, poly (vinyl acetate-co-vinyl chloride) copolymer resin, poly(vinyl acetate-co-ethylene) resin, cellulose acetate butyrate, ethylcellulose and acetylcellulose and at least one member selected from the group consisting of ketone resin, xylene resin, polyamide resin, and acrylic resin.

5. A solid composition according to claim 1 wherein the colorant is a fluorescent pigment in the form of a solid solution in a polyamide resin vehicle.

6. A solid composition according to claim 1, which is a solid writing material.

7. A solid composition according to claim 6, which is a wet-surface writing material.

8. A solid composition according to claim 7, which is a crayon.

9. A solid composition according to claim 1 wherein solvent is included at 20-80% by weight in the solid composition.

10. The composition of claim 1, wherein there are two resin components.

11. A solid composition comprising a colorant, a gelation agent, a resin component, and a mixture of at least two different solvents, wherein the mixture
   (i) comprises at least two solvents selected from the group consisting of ethylene glycol monobutyl ether, propylene glycol monobutyl ether, tripropylene glycol monomethyl ether and dipropyl glycol monomethyl ether; or
   (ii) comprises at least one solvent selected from the group consisting of propylene glycol monobutyl ether, tripropylene glycol monomethyl ether and dipropyl glycol monomethyl ether; and at least one solvent selected from the group consisting of ethylene glycol monobutyl ether, propylene glycol monomethyl ether acetate, tripropylene glycol monomethyl ether, dipropylene glycol monomethyl ether, propylene glycol monobutyl ether, diethylene glycol monobutyl ether, propylene glycol monopropyl ether, dipropylene glycol monopropyl ether, dipropylene glycol monobutyl ether, tripropylene glycol monobutyl ether, propylene glycol monophenyl ether and dipropyl glycol monomethyl ether.

12. A solid composition according to claim 11 wherein the mixture is selected from the group consisting of:
   (i) ethylene glycol monobutyl ether and propylene glycol monomethyl ether acetate;
   (ii) tripropylene glycol monomethyl ether and dipropylene glycol monomethyl ether; and
   (iii) tripropylene glycol monomethyl ether and propylene glycol methyl ether acetate.

13. A solid composition according to claim 11 wherein the resin component comprises at least one selected from the group consisting of ketone resin, xylene resin, polyamide resin, and acrylic resin.

14. A solid composition according to claim 11 wherein the resin component comprises at least one selected from the group consisting of butyral resin, vinyl acetate resin, poly(vinyl acetate-co-vinyl chloride) copolymer resin, poly(vinyl acetate-co-ethylene) resin, cellulose acetate butyrate, ethylcellulose and acetylcellulose and at least one member selected from the group consisting of ketone resin, xylene resin, polyamide resin, and acrylic resin.

15. A solid composition according to claim 11 wherein the colorant is a fluorescent pigment in the form of a solid solution in a polyamide resin vehicle.

16. A solid composition according to claim 11, which is a solid writing material.

17. A solid composition according to claim 16, which is a wet-surface writing material.

18. A solid composition according to claim 17, which is a crayon.

19. A solid composition according to claim 11 wherein solvent is included at 20-80% by weight in the solid composition.

20. The composition of claim 11, wherein there are two resin components.

* * * * *